Nov. 17, 1964 D. F. WINTER ETAL 3,157,850

MAGNETIC CORES

Filed April 29, 1959 5 Sheets-Sheet 1

David F. Winter
Albert F. Chase,
Inventors.
Koenig and Pope,
Attorneys.

David F. Winter
Albert F. Chase,
Inventors.
Koenig and Pope,
Attorneys.

David F. Winter
Albert F. Chase,
Inventors.
Koenig and Pope,
Attorneys.

MAGNETIC CORES

Filed April 29, 1959 5 Sheets-Sheet 4

David F. Winter
Albert F. Chase,
Inventors.
Koenig and Pope,
Attorneys.

David F. Winter
Albert F. Chase,
Inventors.
Koenig and Pope,
Attorneys.

3,157,850
MAGNETIC CORES

David F. Winter and Albert T. Chase, Kirkwood, Mo., assignors to Moloney Electric Company, St. Louis, Mo., a corporation of Delaware Filed Apr. 29, 1959, Ser. No. 809,865
26 Claims. (Cl. 336—216)

Figures 1, 2:
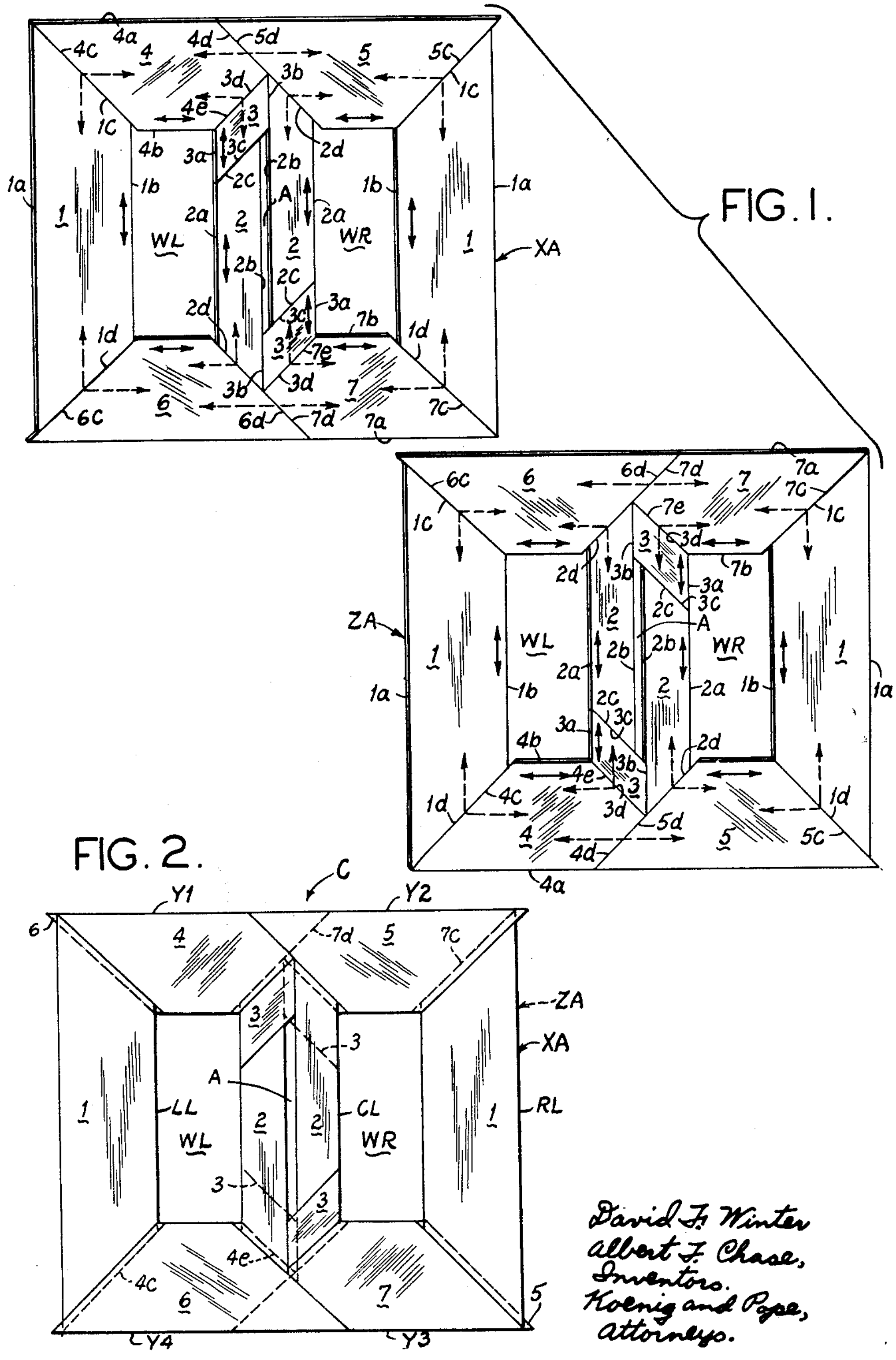

This invention relates to magnetic cores, and more particularly to flat, stacked, laminated magnetic cores for electrical induction apparatus, such as transformers and the like.

Among the several objects of this invention may be noted the provision of magnetic cores which have improved electrical and physical characteristics; the provision of magnetic cores of the class described which have decreased core losses and exciting currents, and lowered noise levels; the provision of such magnetic cores which have improved flux transfer characteristics at junctions between the center leg and yoke members during all phases of flux travel; the provision of cores which have improved flux transfer characteristics at the junctions between the outer leg and the yoke members; the provision of cores which have improved cooling characteristics; the provision of magnetic cores of the class described in which the lines of junction between layer components are at oblique angles and all are preferably at 45° to the direction of grain orientation; and the provision of such magnetic cores which may be more simply and easily assembled and require minimum handling of the components. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIGS. 1, 3, 5, 7 and 9 are oblique projections of two adjacent layers of five different flat, stacked, laminated magnetic core embodiments of the present invention; and, FIGS. 2, 4, 6, 8 and 10 are plan views of the assembled layers of FIGS. 1, 3, 5, 7 and 9, respectively.

Corresponding reference characters indicate corresponding parts throughout the several views of the drawings.

Transformers, particularly transformers of high load capacity, such as power transformers, usually have cores formed of layers of flat-stacked strips of grain-oriented magnetic material. By assembling such grain-oriented magnetic strips in a manner so that the direction of grain orientation in each of the various strips is parallel to the natural paths of the magnetic lines of flux in each of the various cyclic phases of operation of the transformer core, the core losses of the assembled transformer core and coil unit can be greatly minimized. Therefore, it is highly desirable to assemble the strips of magnetic material which comprise the leg and yoke members of the core in such a way that the magnetic flux is continuously parallel to the direction of grain orientation. In many types of laminated cores there are three parallel leg members and parallel yoke members perpendicular thereto and interconnecting the ends of the leg members.

In the area where the ends of the center leg members abut or are joined to the ends of the several yoke members, there is a continual changing of flux paths during cyclic phases of operation. For example, during each cycle of operation there are two phases in which the magnetic lines of flux do not traverse the center leg members; another two phases when all of the lines of flux must traverse the center leg members; and a number of phases wherein half or more of the flux must travel through the center leg. In order to minimize the reluctance to the magnetic lines of flux during the flux interchanges which take place in this center leg-yoke area, flux must be able to pass easily between each part of the center leg member and each of the yokes in these T-shaped areas. It is also desirable from the standpoint of cooling, ease of assembly, and electrically (to minimize the tendency of the flux to crowd or travel across the grain direction near any corner or in any joint area where there is sharp transition in the flux path), that the grain-oriented steel leg and/or yoke members be split longitudinally to form one or more laterally spaced apart strips. Another advantageous arrangement to minimize the reluctance in the magnetic flux paths in a laminated flat stacked core is to avoid superposing or registration of the line of junction formed at abutting joints between strips or components of the core legs and yokes in one layer with those in an alternate layer. Thus it can be seen that there are a number of difficult problems to be overcome in providing an electrically efficient, mechanically sturdy, and physically desirable laminated, flat, stacked magnetic core, which may be assembled conveniently and has a minimum number of different sized pieces or components. A number of various approaches to a satisfactory solution of this problem have been made, but the constructions proposed have had certain substantial disadvantages, such as the inclusion of unusually shaped pieces that are difficult to form and handle, or the necessity of an excess number of differently sized and shaped pieces. In any event, such constructions are difficult to assemble and have certain undesirable electrical characteristics.

In accordance with the present invention, magnetic cores having leg and yoke members (each of which includes a stack of flat layers of magnetic material) are provided, which cores have highly desirable electrical characteristics, such as very low core losses, and superior physical characteristics, such as heat dissipation, low noise levels; which include a minimum number of components; and which may be assembled with ease. In essence, the invention comprises forming layers in one or more of these leg and/or yoke members from two or more parallel, laterally spaced apart strips of grain-oriented magnetic material, and one or more flat pieces or inserts of grain-oriented magnetic material. Each of the inserts in a given one of these leg and/or yoke layers has one pair of parallel side edges extending in the direction of its grain orientation and parallel end edges oblique to the side edges. Each of the strips in a given one of these leg and/or yoke layers has parallel side edges extending in the direction of its grain orientation and at least one end edge oblique to its side edges. Each of these inserts, preferably of generally rhomboidal shape, is positioned endwise of one of the strips with one end edge of said strip in butt joint contact with one end edge of the insert, thus forming a line of junction between the respective insert and strip which is oblique to the direction of grain orientation in the strip and the insert. This unique structure constitutes a module which can be advantageously repetitively employed in any one or more leg member layers, and/or yoke member layers. When embodied in a center leg or yoke member, it is preferred that the width of the insert exceed the width of its respective endwise positioned strip, and more desirably that the insert's width is sufficient to span the lateral gap between two strips, so that one side edge of the insert is in butt joint contact with at least a portion of one side edge of the adjacent strip. When embodied in an outer leg layer, it is preferred that the width of the insert be approximately equal to that of its respective endwise positioned strip, and that the side edges of the insert and strip be longitudinally aligned. It will be seen that a large number of various desirable magnetic core embodiments may be conveniently assembled by repetitive use of these modules in one or more selected areas of flux transfer through a common junction, such as at the magnetic interconnections between core leg and/or yoke members. Also, this module may be easily relatively shifted in alternate given leg and/or yoke layers, so that the lines of junction formed by the butt joints in successive layers are offset or displaced to further reduce the reluctance of the magnetic core circuit by providing bypass flux paths around each butt joint. The term "layer" as used herein includes not only a single thickness or ply of magnetic material, but also a composite or assembly of two or more discrete thicknesses or plies of magnetic material, each of which plies in a given layer is congruent with the others in that layer and superposed in registry therewith, or each of which thickness or plies in a given layer is made up of component parts, each of which is superposed in registry over congruent ply parts in an adjacent thickness in that given layer. The term "butt joint" as used herein includes not only a flux transmitting joint between two or more layer components in the same plane, which components actually physically or mechanically abut along a line of junction, but also where there is substantial abutment and the adjacent layer components are contiguous or in quite close proximity.

Thus, this module constitutes a highly flexible "building block" for laminated flat stacked cores. A number of various embodiments of the present invention are illustrated in the drawings to exemplify this wide range of flexibility of our invention, the many and different significant advantages of which are set forth in additional detail hereinafter in the following description of these various embodiments.

Referring now to FIGS. 1 and 2, a three-phase laminated, flat, stacked, magnetic transformer core is indicated generally at C. Two typical adjacent or alternate core layers of C are illustrated at XA and ZA. The core C, comprising these two core layers and others similar thereto, is constituted by three parallel leg members LL, CL and RL, and two pairs of parallel yoke members Y1, Y4 and Y2, Y3 extending perpendicular to the leg members and interconnecting the ends thereof. Each of the leg and yoke members includes a plurality of stacked layers or strips of magnetic material grain oriented in a direction parallel to their length. A given layer of leg LL is seen to include a strip 1 of magnetic material of trapezoidal shape with its grain oriented as indicated by the solid arrow, i.e., parallel to side edges 1*a* and 1*b* of strip 1. The opposite end edges 1*c* and 1*d* of strip 1 are oblique to the direction of grain orientation, and are respectively mitered at 45° thereto. A given layer of the other leg RL in the same plane includes an identical trapezoidal shaped strip 1. A given layer of center leg CL in the same plane, i.e., core layer XA, includes two identical parallel strips 2 of trapezoidal shape, and two identical flat inserts or pieces 3 of rhomboidal shape. The magnetic grain in each of these two trapezoidal strips 2 is oriented parallel to side edges 2*a* and 2*b* thereof as indicated by the solid arrows. Strips 2 are longitudinally offset and have their respective adjacent side edges laterally spaced apart to form a gap A therebetween. Each strip 2 has end edges 2*c* and 2*d* oblique to the grain direction. Each of the inserts 3 also has one parallel pair of side edges 3*a* and 3*b* extending in the direction of its grain orientation and one parallel pair of end edges 3*c* and 3*d* oblique to the direction of grain orientation. Each insert 3 is positioned endwise of one of the strips 2 with its end edge 3*c* in butt joint contact with the oblique end edge 2*c* of the strip. Side edges 3*a* and 3*b* of each of the inserts when so assembled at opposite ends of respective strips 2 extend in the same direction as that of side edges 2*a* and 2*b* of strips 2, with side edges 2*a* aligned with insert side edges 3*a*. Each of the inserts 3 is wider than its respective strip 2 by such an increment that the other insert side edges 3*b* are in butt joint contact along a portion of the other side edges 2*b* of strips 2.

To complete the several magnetic circuits in each planar core layer XA, the yoke member layers each comprise a strip of magnetic material with parallel side edges extending in the direction of grain orientation of the strip, and end edges oblique to the direction of grain orientation. A given layer of yoke member Y1 in core layer XA is constituted by a strip 4 of magnetic material having parallel side edges 4*a* and 4*b* and oblique end edges. Left end edge 4*c* of strip 4 is in butt joint contact with the upper end edge 1*c* of strip 1 of leg LL along a line of junction 45° to the direction of both the grain orientations in strips 1 and 4. The right end edge of strip 4 is broken or angled so that instead of strip 4 being a true rhomboid, the lower corner is removed and a generally pentagonal strip results with end edges as indicated at 4*d* and 4*e*. Edge 4*d* abuts a portion of an oblique end edge 5*d* of a trapezoidal strip 5 (which constitutes a given layer of yoke Y2 in the same planar core layer XA). End edge 4*e* of strip 4 is in butt joint contact with the end edge 3*d* of the upper insert 3, thus forming a line of junction which is 45° to the grain orientation of each of the yoke and center leg components 4 and 3. The flux circuit around the rectangular opening or window WL through LL, Y1, CL and Y4 is completed relative to a given layer of yoke member Y4 in core layer XA by another strip 6 of magnetic material of trapezoidal shape having the same over-all length as that of strip 5, but being narrower by a small increment for reasons which will be noted hereinafter. Strip 6 has end edges 6*c* and 6*d* which are mitered and form lines of junction at the butt joint contacts between the lower end edges 1*d* and 2*d* of strips 1 and 2.

The magnetic circuit around rectangular window WR is completed by yoke members Y2 and Y3. Yoke member layer Y3 of core layer XA is constituted by a strip 7 of magnetic material of the same length and general shape as that of strip 4, but is equal in width to strip 6 and therefore narrower by an increment than the widths of strips 4 and 5. Strip 7, having side edges 7*a*, 7*b* and end edges 7*c*, 7*d* and 7*e*, bridges or spans the space or gap between the mitered end edges 1*d*, 3*d* and 6*d* of strip 1 (of leg RL), the other center leg insert 3, and strip 6, in the same manner as end edges 4*c*, 4*d* and 4*e* of strip 4 fit or mate with the end edges 1*c*, 5*d* and 3*d* (of the upper insert 3), as noted above. As end edges 5*c* and 5*d* of strip 5 (layer XA of yoke member Y2) abut end edges 1*c*, 4*d* and 2*d*, the magnetic circuit around rectangular window WR is thereby completed. Each of the lines of junction formed by the various flux transmitting butt joint contacts between endwise adjoined strips and inserts is 45° to the most favorable direction of flux travel.

An adjacent or successive given layer of core C, illustrated in the other section of FIG. 1 as core layer ZA, is formed by a number of strips and inserts each identical in size and shape to those constituting core layer XA, but physically rearranged to form the same over-all pattern having three leg and four yoke members with outer and inner side edges generally aligned to form a superimposable rectangular core layer of the same dimensions with two identical rectangular windows. Thus, the strip and insert components of core layer ZA are isomorphic with the respective components of core layer XA and only two identical sets of ten strips and inserts are necessary to form these two layers. It is also to be noted that there are only seven different shaped components that need to be cut to form all of the core layers and that all but two of the strips in any given core layer are homomorphic. Also, all inserts in all given core layers are congruent; and the remaining two strips (4 and 7) in any given core layer are also homomorphic. This greatly simplifies manufacturing operations in producing cores of the present invention.

The principal differences between the core layers XA and ZA are the reversed positioning of each of the strips 2 and their respective endwise abutting inserts 3, and the transposition or reversal of yoke strips 4, 5 and 6, 7. Inasmuch as the width of yoke strips 6 and 7 is somewhat less than that of yoke strips 4 and 5, transposition of 4, 5 and 6, 7 in alternate core layers XA and ZA causes a displacement or offset of the lines of junction in these two core layers. The effect of this reversal is illustrated in FIG. 2, with the lines of junction at the various flux transition areas respectively offset or displaced in alternate layers. This displacement between adjacent layers provides an overlap at every butt joint contact and effectively constitutes by-pass parallel paths for the flux in these areas.

Operation of a core of this embodiment, assembled so as to include a plurality of alternate or successive core layers XA and ZA, requires the mounting of conventional preformed transformer windings around each of the winding legs LL, CL and RL. Upon energization of the windings by interconnecting this core-coil unit with a three-phase source of power, magnetic flux thereby induced will traverse the magnetic circuits of the core as indicated by the dashed arrows in both core layers XA and ZA. During the several instants or phases in each cycle of operation when flux traverses the center leg, its transition at the T areas where the yoke members join the center leg is efficiently effected because of the low reluctance paths presented by the mitered butt joints along the entire lengths of the outer end edges 3*d* of inserts 3 and the mating edges 4*e* and 7*e* of the yoke strips 4, 7. Restriction or crowding of the flux in these T areas is minimized as the width of each insert 3 is greater than that of each of the center leg strips 2. Also, inasmuch as side edge 3*b* of each of the inserts 3 is in butt joint contact with a portion of side edge 2*b* of each of the other center leg strips 2 in the T areas, the effective width of the center leg at this critical junction is that of a solid strip of grain-oriented steel as wide as two of the strips 2 plus the spacing therebetween. That is, the slot or gap indicated at A (in the noncritical portion of the center leg areas) between the laterally spaced-apart parallel strips 2 is spanned or filled in the critical transition zone so that the maximum width of grain-oriented steel is provided at the ends of the center leg. Thus, whether all of the flux traversing the center leg completes its magnetic circuit through leg LL or RL, or is divided therebetween, a minimum reluctance path is provided in the transition yoke-center leg zones. Similarly, during the phases where no flux traverses the center leg (as shown by the horizontal dashed arrows at the T areas), there is a minimum reluctance path between yoke member strips 4, 5 and 6, 7 along the outer halves of these pairs of endwise positioned strips. Slot A therefore provides a path for unimpeded circulation of coolant during the operation of the transformer, and also conveniently accommodates core clamping bolts (thus avoiding the need to punch and align bolt holes in the center leg strips) without adversely affecting the magnetic circuit reluctance in the yoke-center leg transition areas. Moreover, as the grain orientation in each strip and insert component used in core layers XA and ZA is always parallel to the side edges of these components, and all end edges are oblique and at 45° to the grain orientation, forming and assembly operations are greatly simplified.

It is to be noted that the same general desirable magnetic circuit operation and characteristics are obtained in each of the core members XA and ZA and that the offsetting, overlapping or displacement of the lines of junction between mating end and/or side edges of the various strips and inserts in each of two successive core layers XA and ZA provides alternate by-pass magnetic paths around these butt joint contact lines, thereby further minimizing the reluctance in all parts of the core. In order to further simplify the assembly procedure involved in stacking extremely thin (in the order of, say, .014″) strips several or more feet long and up to several feet wide, layers XA and ZA may each comprise several thicknesses or plies (e.g., three plies each .014″ thick) with the lines of junction of each ply registering with the lines of junction of the other plies in its layer, but with the lines of junction of composite layer XA offset as indicated in FIGS. 1 and 2 from those in composite layer ZA. It is to be understood that in large transformers the layers are frequently built in several sections, the widths of the strips in respective sections being incrementally varied as the build increases, so that a cruciform type core results. That is, to generally conform the cross section of the winding legs LL, CL and RL to the circular opening of the preformed windings that surround them, the width of the strips (or the several strips and inserts) in each leg is varied in each of several "build" sections from a minimum at the outside surfaces of the legs to a maximum at the midpoint thereof. It is also to be understood that in some instances layers of a type differing from XA and ZA may be interposed therebetween or used in one or more sections of a core. However, the use of alternate layers XA and ZA in combination with other type layers provides the highly advantageous results described in proportion to the extent of the use of layers XA and ZA in the finished core. These rather generalized over-all considerations set forth in detail with regard to the embodiment of FIGS. 1 and 2 similarly apply to the other embodiments described below.

Figure 3:
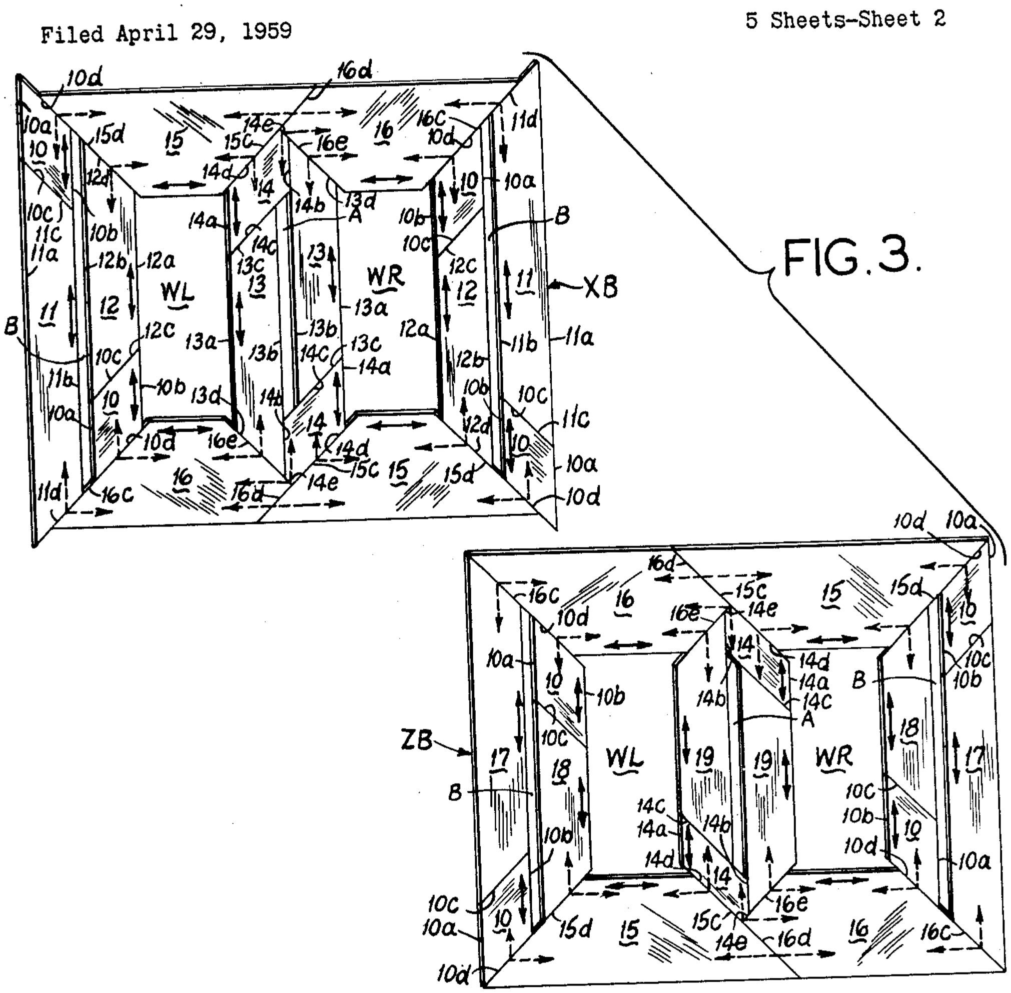
Figure 4:
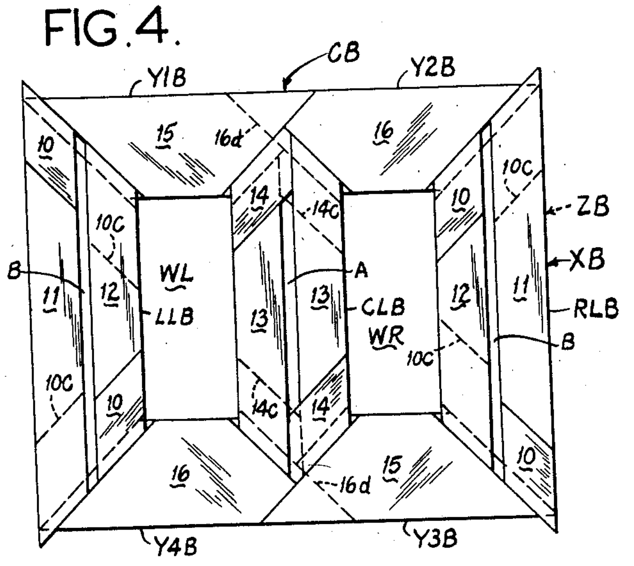

The second embodiment of the present invention, illustrated in FIGS. 3 and 4, employs the two parallel strip-insert module described above not only in the center leg but also in the outer legs of core CB. Also, the shape of the inserts in the center leg, although still generally rhomboidal with two pairs of parallel side and end edges, is slightly modified in that each insert has one corner tip removed. Thus the module is repeated in core CB but in two somewhat modified forms. More particularly, core CB includes at least two given successive core layers XB and ZB adapted to be superposed as shown in FIG. 4 to form a core with three winding legs LLB, CLB and RLB interconnected by four yoke members Y1B, Y2B, Y3B and Y4B, with all lines of junction at butt joint contacts between layer components being 45° to the direction of grain orientation in all adjoining strips and inserts. A given layer of leg member LLB in one core layer XB in this embodiment comprises two identical rhomboid inserts 10 having side edges 10*a* and 10*b* parallel to the direction of grain orientation (solid arrow) and end edges 10*c* and 10*d* oblique thereto. Two trapezoidal strips 11 and 12 of equal width with side edges 11*a*, 11*b* and 12*a*, 12*b* parallel to the direction of grain orientation and respectively aligned with insert side edges 10*a* and 10*b* of the two inserts, constitute the other two components of one given layer of leg member LLB in core layer XA. One insert 10 is positioned endwise of strip 11 with an end edge 11*c* thereof in mitered butt joint contact with insert end edge 10*c*. The other insert 10 is positioned endwise of the opposite end of strip 12 so as to form a mitered butt joint between insert end edge 10*c* and one end edge 12*c* of strip 12. A given layer in the other leg member RLB in the same core layer XB is similarly composed. In each instance a gap B is formed between the opposing side edges 11*b* and 12*b* of the laterally spaced apart, longitudinally displaced leg member strips 11 and 12 in each of the outer leg given layers. This provides a convenient arrangement for accommodation of clamping bolts and also coolant circulation, as well as effecting an advantage in electrical characteristics of the core as will be pointed out in more detail below.

The center leg structure also has a gap A between parallel, spaced apart, longitudinally displaced strips 13, but this gap is bridged in the T areas as in the first embodiment by inserts 14 which each have a width greater than that of the respective endwise positioned strips 13. Thus strips 13 have side edges 13*a* which are aligned with side edges 14*a* of the inserts, while the other insert side edges, designated as 14*b*, are parallel to strip edges 13*b* and are in butt joint contact with a portion of side edges 13*b* of the respective strips 13. By cutting off one corner tip of each of the inserts 14, thereby providing an end edge 14*e*, flux can be easily transferred from end edges 14*d* or 14*e* of each of the center leg inserts 14 to go in either direction in the yoke members.

The magnetic circuits around the open rectangular windows and around the outer legs and yoke members are completed in a given layer of yoke members Y1B–Y4B with two pairs of strips designated 15 and 16. The mitered end edges of trapezoidal strips 15 abut the end edges 10*d*, 12*d* and 14*d* of the corresponding leg end insert components, forming lines of junction 45° to the directions of grain orientation in each of these components. The mitered end edges, designated at 16*c*, 16*d* and 16*e* respectively abut edges 11*d*, 10*d*, 13*d*, 14*e* and 15*c*, thus completing all the yoke and leg magnetic circuits in this core layer.

The alternate or adjacent core layer ZB is again, as in the first embodiment, composed of the same number of strips and inserts as make up core layer XB. However, in this embodiment, the width of yoke member strips 15 and 16 is equal, and in order to provide displacement or offset between lines of junction formed by butt joints in adjacent layers, the lengths of the respective leg strips used in layer ZB are made shorter by an increment than the lengths of leg strips 11, 12 and 13. Thus, leg strips 17, 18 and 19, although equal in width to strips 11, 12 and 13, are each slightly shorter than 11, 12 and 13. It will be noted, however, that only two different shaped yoke strips (15, 16), two different size inserts (10, 14) and six different size leg strips (11–13, 17–19) are necessary to form a pair of given core layers and that all have side edges parallel to the direction of grain orientation and end edges oblique thereto. Transposition of inserts 10 and 14 relative to the leg member strips 11–13 and 17–19, and transposition of yoke strips 15 and 16 will thereby provide the desirable by-pass flux paths in alternate layers across the butt joint contacts at the displaced lines of junction.

Operation of the core of this FIGS. 3 and 4 embodiment is similar to and has the same advantages as set forth with regard to that of FIGS. 1 and 2, and in addition core CB possesses somewhat improved flux interchange characteristics at the center leg-yoke T area and the yoke-outer leg corner junctions. As noted above, flux can more conveniently be transferred to travel in either horizontal direction in the yoke members 15 and 16 from end edges 14*d* and 14*e* than from the single insert end edges 3*d* to yoke members 4–7 in FIGS. 1 and 2. The provision of gap B extending from edge 15*d* to edge 16*c* is effective in preventing crowding of the flux in this magnetic circuit interchange area and thus decreases the reluctance of the given layers at each outside core corner.

Figure 5:
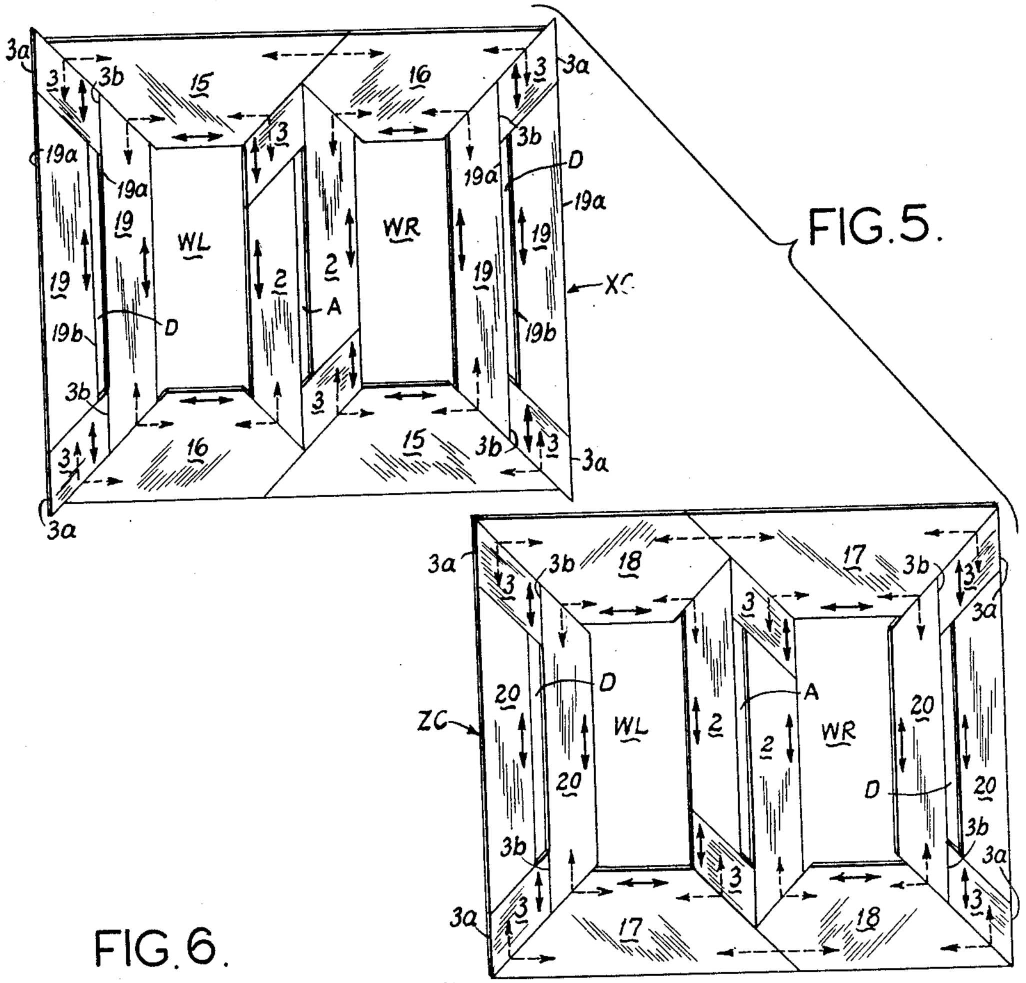
Figure 6:
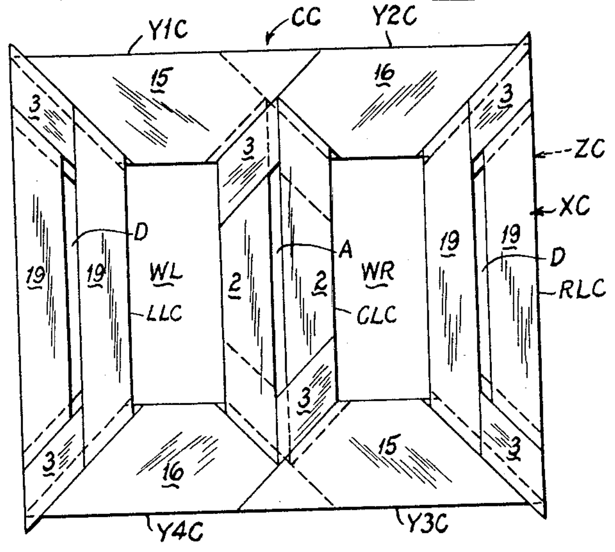

A second split center leg, split outer leg embodiment which combines certain advantages of both previous embodiments is shown in FIGS. 5 and 6. This core, generally designated CC, has given center leg layers in both core layers XC and ZC identical to those of core C and therefore the components thereof are correspondingly designated as inserts 3 and strips 2. The yoke strips in core layer XC are identical to those in core layer XB of FIG. 3, and so are indicated by the same reference numerals, 15 and 16. The yoke strips in another given layer, such as in core layer ZC, are equal in width to yoke member strips 15 and 16, but differ in length by an increment from the lengths of strips 15 and 16. Thus, strips 17 and 18 which constitute given yoke member layers in core layer ZC are each somewhat longer than strips 15 and 16. The outer leg layers in core layer XC each comprise two inserts 3 and two strips 19. However, it will be noted that in this instance, and in contrast to the preceding embodiment, the two inserts 3 in each given outer leg layer are positioned endwise opposite end edges of one of the trapezoidal strips 19. One of the side edges, as indicated at 3*a*, of each of the inserts 3 is aligned with a side edge 19*a* of strip 19, but as the width of these inserts 3 is greater than that of strips 19, the other side edges 3*b* of these inserts are parallel and offset from strip side edges 19*b*. As illustrated, the side edges 3*b* of each insert 3 are in butt joint contact with a portion of side edge 19*a* of the adjacent strip 19. The arrangement of the inserts 3 in the other given outer leg layer in core layer ZC is quite similar to that in XC, except that strips 20 are used in place of strips 19. Strips 20 differ from strips 19 only in that the strips 20 are longer by an increment than strips 19. When two given core layers XC and ZC are superposed in assembly as illustrated in FIG. 6, it will be noted that all lines of junction at butt joint contacts are at 45° and displaced in alternate or successive layers. This desirable offset results from the incremental length differences between yoke strips 15, 16 and 17, 18, and the similar length differences between strips 19 and 20 in alternate given core layers XC and ZC.

The operation of a core constructed in accordance with FIGS. 5 and 6 is generally the same as that described in regard to the FIGS. 3 and 4 embodiment. The degree of minimization of flux crowding at the corners at the junctions between the abutting end edges of inserts 3 and end edges of leg strips 19 and 20 with the respective oblique end edges of yoke strips 15–18 is somewhat less in this embodiment inasmuch as the inserts 3 are wide enough to span the gaps indicated at D between pairs of adjacent strips 19 or 20. There is an attendant physical advantage however in the FIGS. 5, 6 embodiment because all inserts in all given core layers are congruent. If further enhanced electrical properties at the outer core corners of FIGS. 5, 6 are desired, the inserts 3 in the outer leg members could be cut narrower (and thus not be congruent with the center leg inserts 3) and preferably of a width equal to strips 19 or 20. This would cause gap D between adjacent strips 19 and adjacent strips 20 in the outer leg given layers to extend the entire distance between the mitered end edges of yoke strips 15–18 and thus further minimize flux crowding at the outer core corners in each layer. Another particular feature of this embodiment which is to be noted is the use of four congruent pieces 19 (and four congruent pieces 20) for the outer leg strips in each given core layer, which further simplify forming and assembly operations.

Figures 7, 8:
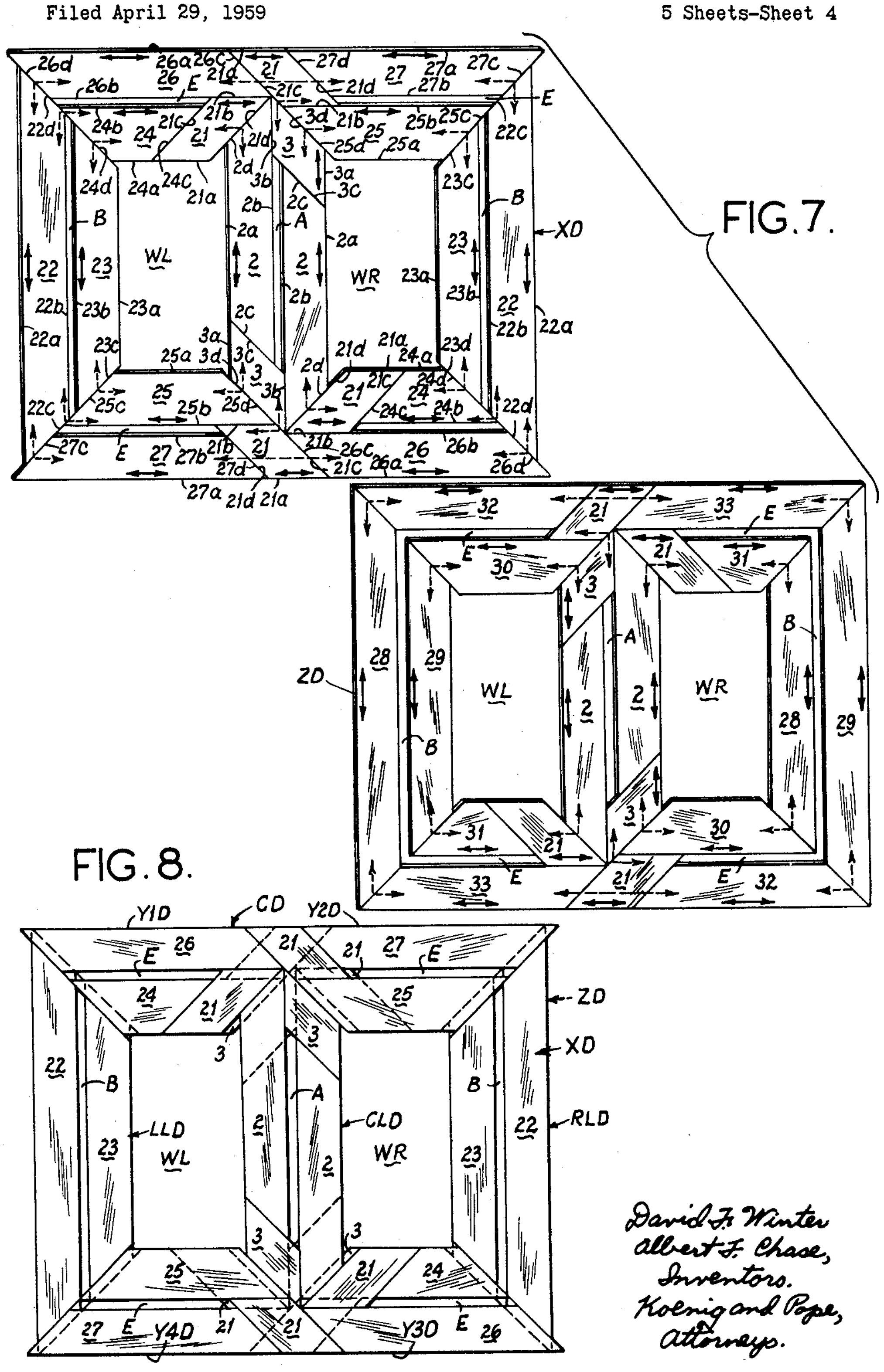

The fourth embodiment, FIGS. 7 and 8, is a core designated CD in which the novel one insert-two strip module is used in both the center leg and each of the yoke members in each given core layer XD and ZD. Each of the given layers of center leg CLD comprises the same strip and insert components arranged as described in the cores of FIGS. 1, 2, 5 and 6, and are correspondingly referenced by numerals 2 and 3. The given layers of outer leg members LLD and RLD simply comprise pairs of parallel laterally spaced trapezoidal strips 22, 23 (in core layer XD) and 28, 29 (in core layer ZD). These leg strips are of equal width but strips 28 and 29 are each longer than 22, 23, respectively, by the same increment. As in the previous cores, this length increment difference in similar components in successive layers effects the relative displacement of lines of junctions at butt joint contacts in adjacent layers. No inserts are utilized in this embodiment in the outer core legs, and the lateral spacing or gap B between each of the pairs of leg strips 22, 23 and 28, 29 for the entire length of each of the outer legs decreases the usual flux crowding tendency at the outside core corners.

A significant feature of core CD is the use of the two strip-one insert module in each given layer of yoke members Y1D–Y4D. Referring more specifically now to a given layer of yoke member Y1D in core layer XD, two strips 24 and 26 having parallel side edges 24*a*, 24*b* and 26a, 26b, respectively, are positioned parallel each other and spaced apart so as to form a gap E. Each strip 24 and 26 has oblique end edges 24c, 24d and 26c, 26d. An insert 21, having parallel side edges 21a, 21b and parallel end edges 21c, 21d at an angle oblique to these side edges, is positioned endwise strip 24 with insert end edge 21c in butt joint contact with strip end edge 24c. The side edges 24a, 24b of strip 24 extend in the same direction as insert side edges 21a, 21b, with side edge 21a longitudinally aligned with strip side edge 24a. Insert 21 is wider than strip 24 by an increment equal to the width of gap E and therefore insert side edge 21b is in butt joint contact with one portion of side edge 26b of strip 26. A given layer of yoke member Y3D in core layer XD is identical to that of Y1D just described. Given layers of yoke members Y2D and Y4D in core layer XD also correspond and each includes two parallel spaced apart strips 25, 27 with side edges 25a, 25b and 27a, 27b, respectively. The corresponding gap between adjacent strip edges 25b, 27b is also indicated at reference character E.

Each strip has end edges 25c, 25d and 27c, 27d, respectively, at angles oblique (45°) to the grain orientation. The module in the given layer Y2D shown in the upper part of FIG. 7 includes an insert 21 positioned endwise of strip 27 with one side edge 21a longitudinally aligned with strip side edge 27a and its other side edge 21b extending in the same direction as side edge 27b. Again the extra width of insert 21 spans gap E and side edge 21b is in butt joint contact with a portion of side edge 25b. As the Y4D given layer in this planar core layer XD is identical to that of Y2D and additional reference characters may tend to obscure the structural features, and also because the electrical and physical interrelationship of the components is apparent from the drawings, further detailed description and referencing of FIG. 7 has been omitted.

The magnetic circuit in core layer XD is again indicated by the dashed arrows, and the direction of grain orientation in each strip and insert by solid arrows. Low reluctance paths are provided at each of the outer corners or junction areas where the outer leg end edges of strips 22 and 23 but end edges 24d, 25c, 26d and 27c of each of the yoke member strips. Also in the T area, minimum reluctance paths are provided to accommodate the flux during all cyclic phases of magnetic interchange. For example, flux may conveniently traverse the entire length of a given layer of yoke members Y1D and Y2D in the direction of grain orientation via strips 26, outer insert 21 and strip 27 all of which are substantially axially aligned. The same advantageous feature is provided in a given layer of Y3D and Y4D. During the several phases when all or a substantial portion of the flux must be carried by the center leg strips 24, inner inserts 21 and strip 25 provide low reluctance flux paths and efficient transposition at their junctions with the mitered end edges of strips 22, 23, 2 and inserts 3.

The other given core layer ZD of core CD differs from layer XD, as noted above, only in the transposition and incremental longitudinal shifting of components 2, 3 and 21 which are arranged and interfitted with outer leg strips 28, 29 (differing from 22 and 23 only in being somewhat longer) and yoke member strips 30–33 (which are longer but the same width as strips 24–27). The resultant lapping of the butt joints in the assembled given core layers XD and ZD, as shown in FIG. 8, has the same beneficial effect electrically and as to mechanical interlocking to increase the core strength as is the case in the preceding embodiments. Core CD, because of gaps A, B and E, has improved heat dissipation characteristics. It will be understood that inserts could be used in the outer leg member layers in the fashion of FIGS. 3–6, and that many possible rearrangements and relative component size changes could be made in this particular core embodiment, as in the others, to provide certain additional advantageous electrical or physical features, all within the scope of the present invention.

The last core embodiment, generally indicated at reference character CE, includes alternate core layers XE and ZE, each of which has center and outer leg members (CLE, LLE and RLE, respectively) and yoke members (Y1E–Y4E) comprising three spaced apart strips. The two strip-one insert module in yet another varied form is utilized in each given center leg layer in this exemplary species of the invention. Two identical strips 34 of trapezoidal shape, a third strip 35 of rhomboidal shape, and two identical rhomboidal inserts 36 constitute each given layer of center leg CLE. Each of the strips 34 and 35 has parallel side edges 34a, 34b, 35a and 35b extending in the direction of the grain orientation of each of the respective strips. Strip 35 has parallel end edges 35c and 35d oblique to the grain direction, while strips 34 each have one end edge 34c oblique their grain orientation and another end edge 34d normal to the direction of grain. Inserts 36 have one pair of side edges 36a and 36b extending in the same direction and longitudinally aligned with side edges 34a and one of the side edges 35a or 35b of strip 35. Thus the width of insert 36 is equal to the width of two strips 34, 35 and the gap or spacing (as indicated at F) therebetween. One end edge 36c of each of the inserts is in butt joint contact with the two end edges 34c and 35c (or 35d) of strips 34 and 35. The other edge 36d of these two inserts 36 and the end edges 34d of strips 34 are respectively in butt joint contact in the T area with strip components in a given layer of the four yoke members. In this instance, four of the yoke member strips, indicated at 37 and 38, in core layer XE are trapezoidal in shape with one end edge perpendicular to the grain direction. The other six yoke member strips referenced 39–41 are rhomboidal in shape. Thus a given layer of each of the yoke members Y1E and Y3E includes one strip 37 and one strip 38 with the respective perpendicular end edges in butt joint contact with one insert side edge 36b. The other two yoke members Y2E and Y4E in a given layer each include two rhomboidal strips 39, 40 with oblique end edges in butt joint contact respectively with one end edge 36d of each of the inserts 36. Strips 41 span the entire distance between center legs LLE and RLE and provide an uninterrupted axial flux path therebetween. The lateral spacings between the respective side edges of strips 37–41 constitute gaps G and H which provide improved heat transfer characteristics and enhanced electrical properties of core CE. The outer mitered end edges of strips 37–41 are in butt joint contact with the mitered end edges of parallel, spaced apart, trapezoidal leg strips 42, 43 and 44 in each given layer of each outer leg LLE and RLE. Gaps J and K are thereby formed between strips 42, 43 and 44 which permit free circulation of insulating oil and slots for receiving core clamping bolts.

Alternate core layers ZE in any core CE comprise similar shaped inserts and strips in the yoke and outer leg members and identical strips 34, 35 and inserts 36 in the center leg layer, which center leg components are merely transposed as indicated in ZE to provide the desirable displacement or offset of the lines of junction formed by the butt joint contacts in alternate layers. A similar displacement or offset of lines of junction at the butt joint contacts between outer leg member strips and yoke member strips is effected by using three outer leg member strips 45, 46 and 47 in each given outer leg layer that are equal in width, similar (i.e., trapezoidal in shape) but each equally incrementally longer than the respective strips 42, 43, 44 in alternate layers. Similarly, each of the respective trapezoidal yoke members strips, as indicated at 48–52, is similar in shape and equal in width to strips 37–41, except strips 48–52 are each shorter in length by an equal increment than the respective strips 37–41.

Figures 9, 10:
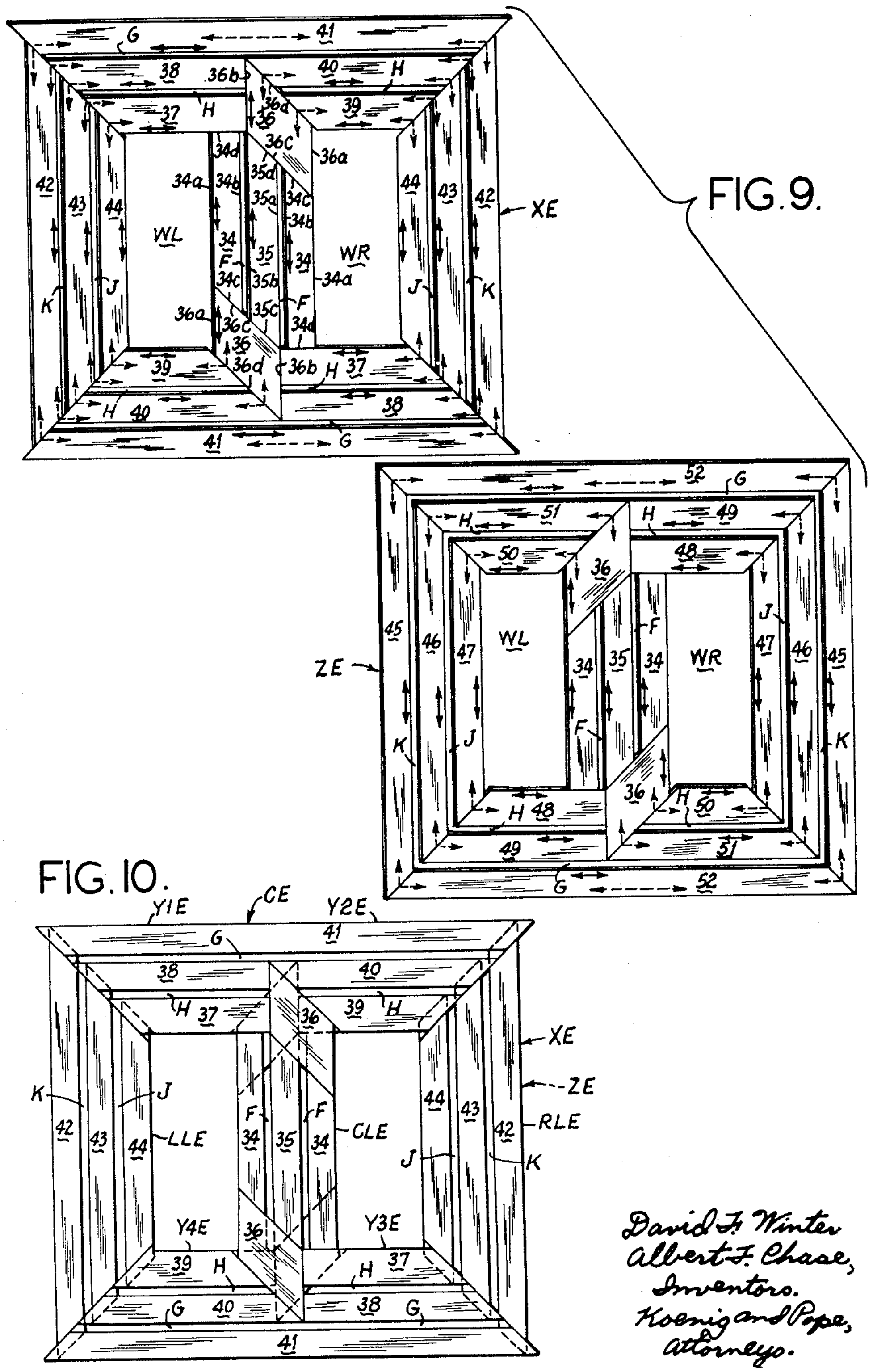

The operation, physical features and electrical characteristics of the core species of FIGS. 9 and 10 are generally similar to those described above in regard to the other species. There are certain differences in the T area in this embodiment, for example, the inclusion of a few butt joint contact lines of junction which are not oblique to the respective direction of grain orientation, dictated in part by the use of the two strip-one insert module in a leg member given layer with three parallel strips. However, advantages of the module are nevertheless realized and increased heat dissipation results by the three-strip variation used in this particular core. It is to be understood that the two strip-one insert module may also be used in the outer leg layers or in the yoke members if desired. As a triple leg-triple yoke core of this type is usually used only in the largest sizes of power transformers, it may be quite desirable to use the module in the outer legs and yoke members for the additional reason that the length of the strips is decreased thereby and they can be easily annealed in standard annealing furnaces, rather than in furnaces that must be extra long to accommodate excessively long strips.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In a magnetic core for electrical induction apparatus having leg and yoke members, one of said members including a plurality of layers each of which comprises a plurality of strips and an insert of grain-oriented magnetic material, each strip having parallel side edges extending in the direction of its grain orientation and end edges at least one of which is oblique to its side edges, each insert having parallel side edges extending in the direction of its grain orientation and parallel end edges oblique to its side edges, the strips in a given layer being positioned side-by-side in laterally spaced parallel relation, the insert in a given layer being positioned endwise of one of the strips in said layer with one end edge of said insert in butt joint contact with the said oblique end edge of said strip along the entire extent thereof and with one side edge of said insert longitudinally aligned with one side edge of the respective associated strip which it abuts, the width of said insert being greater than the width of its respective associated strip.

2. In a magnetic core as set forth in claim 1, said one member being a leg member.

3. In a magnetic core as set forth in claim 1, said one member being a yoke member.

4. A magnetic core as set forth in claim 1 in which the other one of the side edges of said insert is in butt joint contact with a portion of one side edge of the adjacent strip.

5. In a magnetic core for electrical induction apparatus having parallel leg members and parallel yoke members extending perpendicular thereto and interconnecting the end of said leg members, each of said leg members including a plurality of layers each of which comprises a plurality of strips and an insert of grain-oriented magnetic material, each strip having parallel side edges extending in the direction of its grain orientation and end edges at least one of which is oblique to its side edges, each insert having parallel side edges extending in the direction of its grain orientation and parallel end edges oblique to its side edges, the strips in a given layer being positioned side-by-side in laterally spaced parallel relation, the insert in a given layer being positioned endwise of one of the strips in said layer with one end edge of said insert in butt joint contact with the said oblique end edge of said strip along the entire extent thereof and with one side edge of said insert longitudinally aligned with one side edge of the respective associated strip which it abuts, the width of said insert being greater than the width of its respective associated strip.

6. In a magnetic core for electrical induction apparatus having parallel leg members and parallel yoke members extending perpendicular thereto and interconnecting the ends of said leg members, at least one of said leg members and all of said yoke members each including a plurality of layers each of which comprises a plurality of strips and an insert of grain-oriented magnetic material, each strip having parallel side edges extending in the direction of its grain orientation and end edges at least one of which is oblique to its side edges, each insert having parallel side edges extending in the direction of its grain orientation and parallel end edges oblique to its side edges, the strips in a given layer being positioned side-by-side in laterally spaced parallel relation, the insert in a given layer being positioned endwise of one of the strips in said layer with one end edge of said insert in butt joint contact with the said oblique end edge of said strip along the entire extent thereof and with one side edge of said insert longitudinally aligned with one side edge of the respective associated strip which it abuts, the width of said insert being greater than the width of its respective associated strip.

7. A three-phase magnetic core for electrical induction apparatus comprising a plurality of superposed layers of flat stacked strips of magnetic material having its grain oriented substantially parallel to the lengthwise dimension of said strips, said strips being arranged to form two parallel outer core winding legs and parallel yoke members extending perpendicular thereto and interconnecting the ends of said legs, and a center winding leg parallel to said outer legs comprising a plurality of layers of strips and flat inserts of grain-oriented magnetic material, each insert having parallel side edges extending in the direction of its grain orientation and parallel end edges oblique to its side edges, said strips in a given center leg layer being laterally spaced apart and parallel and grain-oriented in their lengthwise direction, each insert in a given layer being positioned endwise of a respective center leg strip with its side edges extending in the same direction as the side edges of said respective center leg strip, one side edge of said insert being longitudinally aligned with one side edge of its respective center leg strip, one end edge of each insert being in butt joint contact with the entire extent of one end edge of its respective center leg strip at an angle oblique to the longitudinal axis of this strip, the other end edge of each said respective center leg strip and the other end edge of its said abutting insert being in butt joint contact with respective opposite yoke strips in a given layer, the width of each insert being greater than the width of its respective center leg strip.

8. A magnetic core as set forth in claim 7 in which a given center leg layer comprises two inserts of rhomboidal shape and two center leg strips of trapezoidal shape, the width of each of said inserts being greater than the width of its respective center leg strip.

9. A magnetic core as set forth in claim 7 in which the other insert side edge is in butt joint contact with a portion of one side edge of the adjacent center leg strip.

10. A magnetic core as set forth in claim 7 in which the lines of junction formed by said butt joint contacts between said yoke strips and said other end edges of said center leg strips, and the lines of junction formed by said butt joint contacts between said yoke strips and said other end edges of the inserts, are all at angles oblique to the respective directions of grain orientation in said yoke and center leg strips and said inserts.

11. A magnetic core as set forth in claim 10 in which each of the oblique angles is approximately 45°.

12. A magnetic core as set forth in claim 7 in which said insert pieces are congruent, and in which there are at least two center leg strips in each layer which are congruent.

13. A magnetic core as set forth in claim 7 in which the relative endwise positioning of each insert and its associated center leg strip is reversed in each successive layer, whereby the lines of junction formed by said butt joint contacts at said end edges of said inserts, at said center leg strips, and at said yoke strips, are respectively offset in adjacent layers.

14. A magnetic core member as set forth in claim 7 in which each outer leg in a given layer comprises two parallel spaced-apart strips.

15. A three-phase magnetic core for electrical induction apparatus comprising a plurality of superposed layers of flat stacked strips of magnetic material having its grain oriented substantially parallel to the lengthwise dimension of said strips, said strips being arranged to form two parallel longitudinally divided outer core winding legs are parallel yoke members extending perpendicular thereto and interconnecting the ends of said legs, and a center winding leg parallel to said outer legs comprising a plurality of layers of strips and flat inserts of magnetic material, each insert having parallel side edges extending in the direction of its grain orientation and parallel end edges oblique to its side edges, said strips in a given center leg layer being laterally spaced apart and parallel and grain-oriented in their lengthwise direction, each insert in a given layer being positioned endwise of a respective center leg strip with side edges extending in the same direction as the side edges of said respective center leg strip, one side edge of said insert being longitudinally aligned with one side edge of its respective center leg strip, one end edge of each insert being in butt joint contact with the entire extent of one end edge of its respective center leg strip at an angle oblique to the longitudinal axis of this strip, the other end edge of each said respective center leg strip and the other end edge of its said abutting insert being in butt joint contact with respective opposite yoke strips in a given layer, the width of each insert being greater than the width of its respective center leg strip.

16. A magnetic core as set forth in claim 15 in which each of said outer legs in a given layer comprises two parallel laterally spaced-apart strips of trapezoidal shape, the end edges of which form butt joints with ends of the respective opposite yoke strips in a given layer, the lines of junction formed by said butt joints being at angles oblique to the respective directions of grain orientation in said yoke and outer leg strips.

17. A magnetic core as set forth in claim 16 in which each of said oblique angles is approximately 45°.

18. A magnetic core as set forth in claim 16 in which said lines of junction in a given layer are offset from and parallel to those in adjacent layers.

19. A magnetic core as set forth in claim 16 in which each of the outer legs comprises a plurality of layers of strips and flat inserts of grain-oriented magnetic material, each outer leg insert having parallel side edges extending in the direction of its grain orientation and parallel end edges oblique to its side edges, said strips in a given outer leg layer being laterally spaced apart and parallel and grain-oriented in their lengthwise direction, each insert in a given outer leg layer being positioned endwise of a respective outer leg strip with its side edges extending in the same direction as the side edges of said respective outer leg strip, one side edge of each outer leg insert being longitudinally aligned with one side edge of its respective outer leg strip, one end edge of each outer leg insert being in butt joint contact with the entire extent of one end edge of its respective outer leg strip at an angle oblique to the longitudinal axis of this strip, the other end edge of each outer leg strip and the other end edge of its said abutting insert being in butt joint contact with respective opposite yoke strips in a given layer.

20. A magnetic core as set forth in claim 19 in which each given leg layer comprises two inserts of rhomboidal shape and two leg strips of trapezoidal shape.

21. A magnetic core as set forth in claim 19 in which the width of each of said outer leg inserts is approximately equal to the width of its associated outer leg strip.

22. A magnetic core as set forth in claim 19 in which said other insert side edge is in butt joint contact with a portion of one side edge of one adjacent leg strip.

23. A magnetic core as set forth in claim 19 in which said center leg inserts are congruent, and in which there are at least two center leg strips in each layer which are congruent.

24. A magnetic core as set forth in claim 19 in which the relative endwise positioning of each insert and its associated leg strip is reversed in each successive layer, whereby the lines of junction formed by said butt joint contacts between said end edges of said inserts and said leg strips and said yoke strips are respectively offset in adjacent layers.

25. A magnetic core as set forth in claim 15 in which a given layer of each of said yoke members comprising at least two strips and a flat insert of grain-oriented magnetic material, said yoke insert having parallel side edges extending in the direction of its grain orientation and parallel end edges oblique to its side edges, said strips in a given one yoke member layer being laterally spaced apart and parallel and grain-oriented in their lengthwise direction, said insert in a given one yoke member layer being positioned endwise of a respective yoke member strip with its side edges extending in the same direction as the side edges of said yoke member strip, one side edge of said yoke insert being longitudinally aligned with one side edge of its respective yoke member strip, one of the said end edges of said yoke insert being in butt joint contact with the entire extent of one end edge of its respective yoke member strip at an angle oblique to the longitudinal axis of this strip, the other end edge of this strip and the other end edge of its said abutting insert being in butt joint contact with respactive opposite outer leg and center leg strips in a given layer, the width of each yoke insert being greater than the width of its respective yoke member strip.

26. A magnetic core as set forth in claim 25 in which one of the side edges of the insert in any given yoke member layer is in butt joint contact with a portion of a side edge of said other yoke member strip.

References Cited in the file of this patent

UNITED STATES PATENTS

| | | |
|---|---|---|
| 2,467,823 | Gordy | Apr. 19, 1949 |
| 2,698,924 | Gordy | Jan. 4, 1955 |
| 2,792,554 | Graham | May 14, 1957 |
| 2,812,505 | Sommerville | Nov. 5, 1957 |
| 2,898,565 | Fox et al. | Aug. 4, 1959 |
| 2,912,660 | Graham | Nov. 10, 1959 |
| 2,922,972 | Gordy | Jan. 26, 1960 |